W. HOSIER.
Churn.
No. 47,952. Patented May 30, 1865.
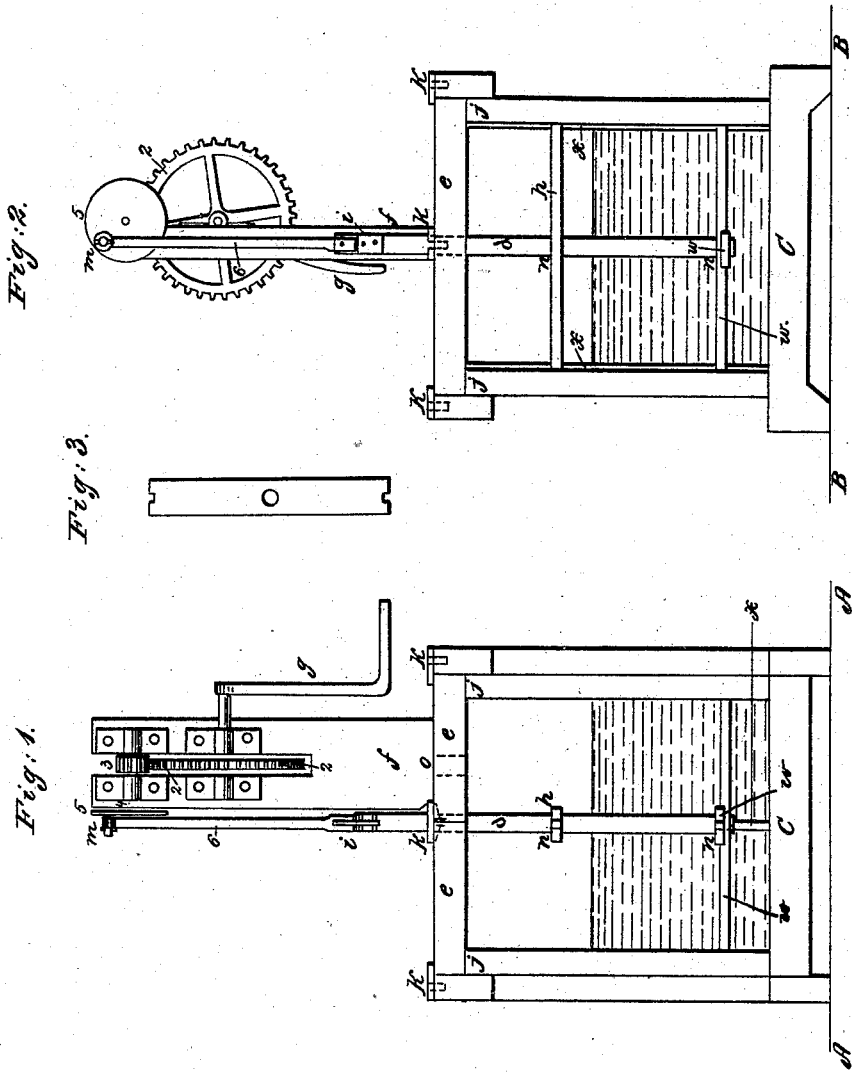

UNITED STATES PATENT OFFICE.

WM. HOSIER, OF WASHINGTON TOWNSHIP, KOSCIUSKO COUNTY, INDIANA.

IMPROVEMENT IN CHURNS.

Specification forming part of Letters Patent No. 47,952, dated May 30, 1865.

*To all whom it may concern:*

Be it known that I, WILLIAM HOSIER, of Washington township, in the county of Kosciusko and State of Indiana, have invented an Improvement in Churns; and I do hereby declare that the following is a full and exact description thereof, reference being had to the accompanying drawings and letters of reference, making a part of this specification, in which—

Figure 1 is a longitudinal section of my improvement in churns, the plane of section being indicated by the line A A. Fig. 2 is a transverse section of my improvement in churns. The plane of section is indicated by the line B B. Fig. 3 is a top or plan view of the foam-dash.

The object of my invention is to provide more convenient means by which butter can be manufactured from cream, and prevent, during the process of churning, the foaming of the cream on the top when of improper temperature.

To enable others skilled in the art to make and use my invention, I will proceed to describe its construction and operation.

First I use any of the square or round churn barrels now in common use. The one used in the drawings is of the square pattern, as will be seen by Fig. 1 at C. The lid of the churn is divided into two parts, as will be seen at *e e*, Fig. 1, the dividing-line passing through the center of the dash-rod *d*. On the inside of the churn at *x x*, Fig. 2, is shown two ribs or guides for the purpose of holding in position and guiding the lower dashers, *w w*, and the foam-dash *h*, Figs. 1 and 2, when put in motion, all of the dashers being attached to the dash-rod at *n n*, the guides being of the proper dimensions to fit the gains or grooves shown on the ends of the plan view of the foam-dash at Fig. 3.

At *k k k*, Figs. 1 and 2, is shown the fastenings or buttons for the purpose of securing the lid firmly down upon the shoulders J J. To one-half of the lid, as at *o*, Fig. 1, is attached a strong upright standard, *f*. The object of this standard is to support the gearing for propelling the dash-rod *d*.

At 2 2, Figs. 1 and 2, is attached a cog-wheel that is turned by the crank *g*. This cog-wheel is intended to drive the pinion-wheel 3, Fig. 1. To this pinion-wheel shaft at 4 is attached the crank-wheel 5. To this crank-wheel at *m* is attached the wrist that the crank 6 revolves upon, the crank 6 being attached to the dash-rod *d* at the joint *i*.

It will be seen from this description that by turning the crank *g* in either direction the dash-rod *d* will be moved up and down, carrying with it the dashers *w w* and the foam-dash *h*, thereby giving the required motion to give any necessary amount of friction to produce butter from cream or milk. The object of the foam-dash *h* is to give motion to the top of the cream at the same time that motion is given to it from the bottom, and also to break the globules rising on the top of the cream, in consequence of improper temperature; or, in other words, to so break the top of the cream that the gases rising may readily pass off. The object of attaching the standard *f* to half of the lid is so that the lid and standard may be taken from the barrel or box of the churn, and allow the same to be cleaned and turned over in any position to air and dry, which could not be done if the standard *f* was secured to the side of the box or barrel, as is usually done.

Operation: In order to use my invention it is first necessary to take off half of the lid opposite the standard *f*, and put in cream or milk not to exceed three-fourths full, then replace the half-lid; then the operation is completed by turning the crank *g* in either direction until the butter is separated from the cream or milk.

Now, having fully described my device, what I claim as my invention, and desire to secure by Letters Patent of the United States, is—

The foam-dash *h*, in combination with the guides *x x* and lower dashers, *w w*, when said dashers are arranged as described, and operated by means of the devices attached to one-half of the lid *e*, as set forth.

WILLIAM $\overset{\text{his}}{\times}$ HOSIER.
mark.

Witnesses:
ELIJAH LINHART,
JAMES ELDER.